(12) United States Patent
Ng

(10) Patent No.: US 8,752,957 B2
(45) Date of Patent: Jun. 17, 2014

(54) DETACHABLE EYEGLASS FRAME

(71) Applicant: Dongguan Action Optic Resources Co., Ltd., Dong Guan (CN)

(72) Inventor: Choon Kheang Ng, Jalan Gangsa (MY)

(73) Assignee: Dongguan Action Optic Resources Co., Ltd., Dong Guan, Guang Dong Province (CN)

( * ) Notice: Subject to any disclaimer, the term of this patent is extended or adjusted under 35 U.S.C. 154(b) by 0 days.

(21) Appl. No.: 13/728,229

(22) Filed: Dec. 27, 2012

(65) Prior Publication Data

US 2014/0036221 A1 Feb. 6, 2014

(30) Foreign Application Priority Data

Aug. 1, 2012 (CN) .......................... 2012 2 0377554

(51) Int. Cl.
*G02C 5/14* (2006.01)
*G02C 5/22* (2006.01)

(52) U.S. Cl.
CPC ............ *G02C 5/2218* (2013.01); *G02C 5/2281* (2013.01); *G02C 5/2245* (2013.01); *G02C 2200/06* (2013.01); *G02C 2200/20* (2013.01)
USPC ............................ 351/116; 351/119; 351/123

(58) Field of Classification Search
CPC .. G02C 5/2218; G02C 5/2281; G02C 5/2245; G02C 2200/06; G02C 2200/20
USPC .......................................... 351/116, 119, 123
See application file for complete search history.

(56) References Cited

U.S. PATENT DOCUMENTS 6,582,075 B1* 6/2003 Swab et al. .................... 351/158
2013/0077041 A1* 3/2013 Chih ............................. 351/116

* cited by examiner

*Primary Examiner* — Scott J Sugarman
*Assistant Examiner* — Daniele Manikeu
(74) *Attorney, Agent, or Firm* — Li & Cai Intellectual Property (USA) Office

(57) ABSTRACT

A detachable eyeglass frame includes a lens frame, a pair of hollow temples, a pair of temple inserts and a pair of hinges. The temple insert resembles a stick ending with a blade having a pocket for receiving the asymmetrical V-shaped hinge. The hinge has a column at one tip and a screw receiving column at the other. The temple insert is received by a sleeve formed within the temple and furthermore the hinge is inserted to the pocket of the temple insert for connecting the temple to the lens frame through a screw.

4 Claims, 4 Drawing Sheets

DETACHABLE EYEGLASS FRAME

BACKGROUND

1. Field of the Invention

The instant disclosure relates to an eyeglass frame; in particular, to an eyeglass frame having easily detachable/replaceable temple inserts.

2. Description of Related Art

As the population of people wearing eyeglasses grows, the demanding and standard of eyeglass frames increases together as well. Conventional eyeglass frames often employ specific hinge structures to connect the lens frame and the temples. In the case of repairing, the original precision thereof may be compromised due to the delicate and complex hinge structure. Hence the defect of a single element may result to the abandon of the whole eyeglass frame. The components of the conventional eyeglass frames have the disadvantage of being less accessible under repairing.

SUMMARY OF THE INVENTION

The object of the instant disclosure is to provide a detachable eyeglass frame for easier individual component accessibility.

According to one exemplary embodiment of the instant disclosure, the detachable eyeglass frame includes a lens frame, a pair of temples and two joints. Each of the joints has a temple insert and a hinge. The temple insert is received within a sleeve of the temple and connects to the lens frame by the hinge. The lens frame is formed with complementary receiving ends, which have a recess and a screw hole, to the hinge. The temple is formed with the sleeve and the stick shaped temple insert is received therein. One end of the temple insert ends with a flat blade having a pocket thereon. The pocket is formed with a U-shaped notch and a slantingly cut slit at the seam between the blade and pocket. The hinge is a resilient component which is also substantially asymmetrically V-shaped. The shorter arm of the hinge has a column with a lid whereas the longer arm thereof is formed with a screw receiving column. The thickness of the blade is approximately the same as that of the slit. The tip where the two arms of the hinge meet is received by the pocket. Furthermore, as the hinge is fully received, the column is fittingly held by the notch and the lid is exposed from the notch. Meanwhile, the screw receiving column abuts the slit and therefore a screw is received simultaneously by the receiving end of the lens frame and screw receiving column to fasten the temple and lens frame.

Moreover, the outline of the screw receiving column is configured to a trapezoid complementary to the slit. The hinge is made of resilient stainless steel. The pocket is positioned lower than the edge of the blade end of the temple insert.

The instant disclosure provides an eyeglass frame with easily accessible components by the demountable hinge. The hinge can be adapted to different types of lens frames. In addition, the highly flexible V-shaped hinge, which is made of stainless steel, provides reliable connection. Furthermore, with easy access to individual and separated component, repairing of the eyeglass frame can be done by replacing a single component.

In order to further understand the instant disclosure, the following embodiments are provided along with illustrations to facilitate the appreciation of the instant disclosure; however, the appended drawings are merely provided for reference and illustration, without any intention to be used for limiting the scope of the instant disclosure.

DETAILED DESCRIPTION OF THE PREFERRED EMBODIMENTS

Figure 1:
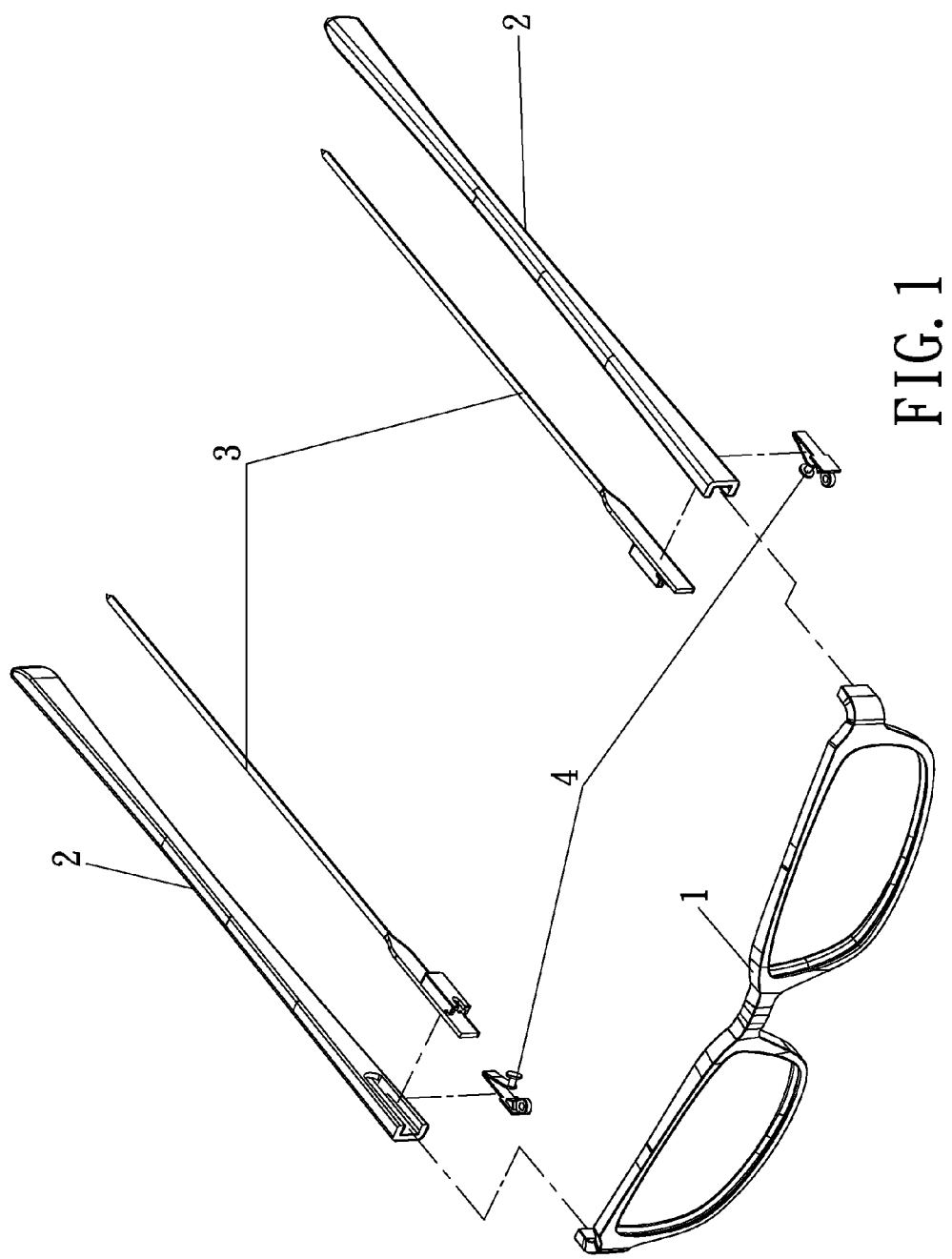
FIG. 1 illustrates an exploded view of a detachable eyeglass frame in accordance with an embodiment of the instant disclosure.
Figure 2:
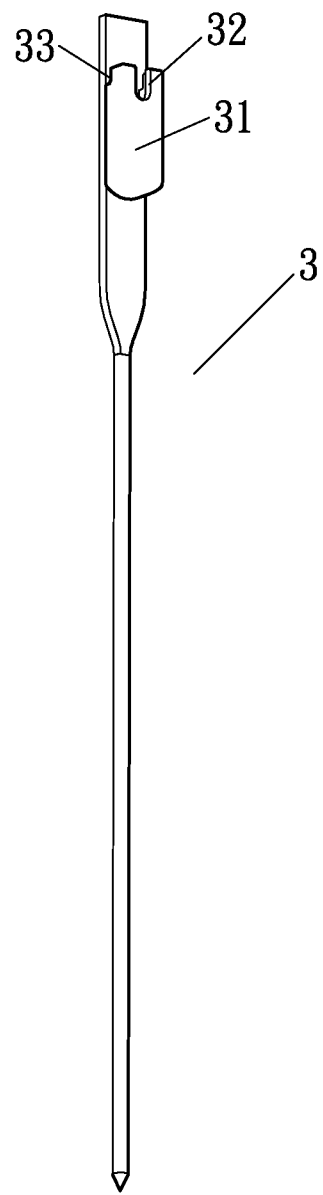
FIG. 2 illustrates a perspective view of a temple insert of a detachable eyeglass frame in accordance with an embodiment of the instant disclosure.
Figure 3:
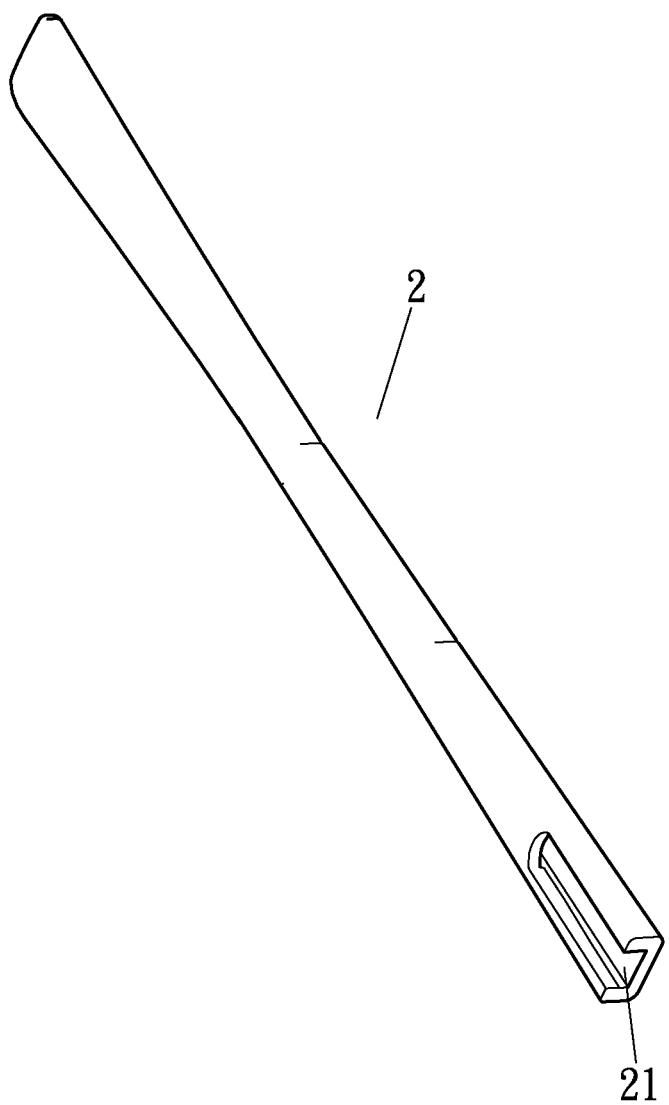
FIG. 3 illustrates a perspective view of a temple of a detachable eyeglass frame in accordance with an embodiment of the instant disclosure.
Figure 4:
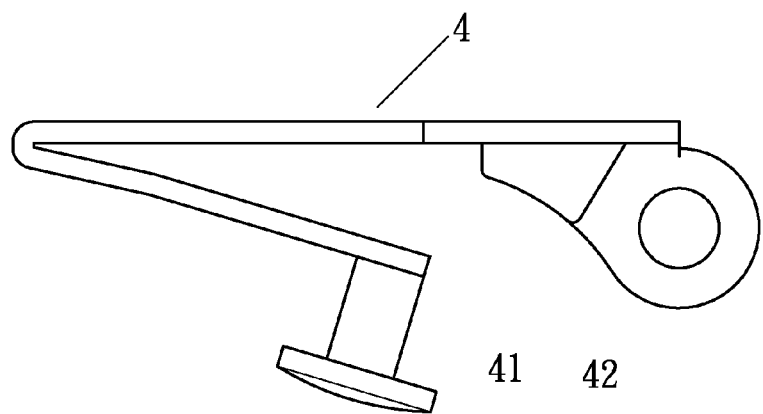
FIG. 4 illustrates an enlarged view of a hinge of a detachable eyeglass frame in accordance with an embodiment of the instant disclosure.
Figure 5:
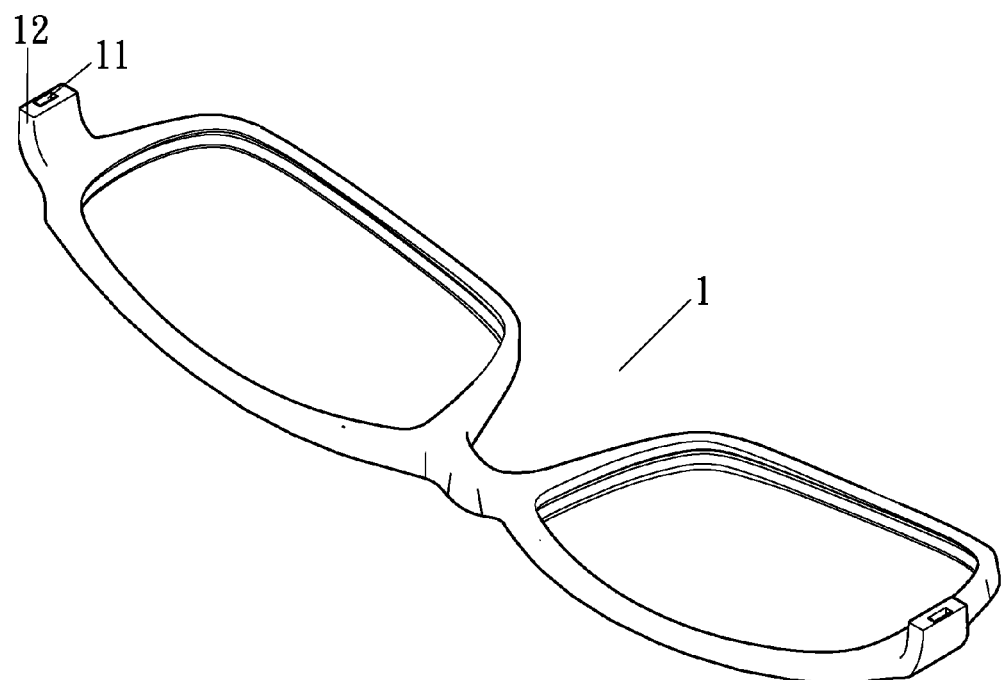
FIG. 5 illustrates a perspective view of a lens frame of a detachable eyeglass frame in accordance with an embodiment of the instant disclosure.

The aforementioned illustrations and following detailed descriptions are exemplary for the purpose of further explaining the scope of the instant disclosure. Other objectives and advantages related to the instant disclosure will be illustrated in the subsequent descriptions and appended drawings.

The instant disclosure provides a detachable eyeglass frame, which includes a lens frame 1, a pair of temples 2 and a pair of joint. Each of the joints includes a temple insert 3 and a hinge 4 connecting to the lens frame 1. Each of the two respective sides of lens frame 1 is configured with a recess 11 for receiving the hinge 4. The temple 2 is hollow thereby a sleeve 21 is formed therein for accommodating the temple insert 3. The temple insert 3 resembles a stick conforming to the sleeve 21 while ending with a blade. Upon insertion, the temple insert 3 is disposed in the sleeve 21 and the blade end is exposed. The blade end is formed with a pocket 31 having a U-shaped notch 32 and slantingly cut slit 33 at the seam between the pocket 31 and the blade. The hinge 4 is highly flexible and substantially asymmetrically V-shaped. The shorter arm of the hinge 4 has a column 4 capping with a lid whereas the longer arm thereof has a screw receiving column 42, which has a trapezoidal outline abutting the slantingly cut slit 33. The tip where two arms of the hinge 4 meet is inserted to the pocket 31. Upon insertion, the column 41 is securely held by the U-shaped notch 32 while the lid is exposed. Furthermore, the screw receiving column 42 partially slides to the pocket 31 and the remaining portion thereof abuts the slit 33. When the screw receiving column 42 is inserted to the recess 11 of the lens frame 1, a screw is used to fasten the two pieces together. The hinge 4 is made of stainless steel, which is reliable and flexible at the same time.

The method of making the detachable eyeglass frame includes the steps of: forming the lens frame 1 and the temple 2 firstly. Secondly, configuring the lens frame 1 to two protruded connecting edges with recess 11 and temple 2 with sleeve 21. Thirdly, stamping the one-piece temple insert 3 and welding the pocket 31 onto the temple insert 3. Furthermore, a resilient stainless steel board is stamped to a thin plate and bent to asymmetrical V shape. Finally, the column 41 is formed on the shorter arm while the screw receiving column 42 is formed on the longer arm.

To assemble the detachable eyeglass frame includes the steps of: inserting the temple insert 3 to the sleeve 21, tucking the hinge 4 to the pocket 31 while the column lid exposed and the screw receiving column 42 abutting the slit 33, and finally the lens frame and the temple fastening together by screws through the screw receiving column 42 and recess 11.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A detachable eyeglass frame comprising:
    a lens frame formed with a recess at the respective sides thereof;
    a pair of hollow temples, each of the temples defining a sleeve therein; and
    a pair of temple inserts, each resembling a stick ending with a blade at one end,
        wherein a pocket having U shaped notch is formed on the blade, and a slantingly cut slit is formed at the seam between the pocket and blade; and
    a pair of hinges, the temple insert conformingly received by the sleeve and connecting the lens frame through the hinge;
        wherein the hinge is resilient and substantially asymmetrically V shaped, the shorter arm thereof has a column with a lid whereas the longer arm thereof has a screw receiving column,
        wherein upon insertion the hinge is inserted to the pocket, the column is held by the U shaped notch with lid exposed, the screw receiving column abuts the slit and fits into the recess for receiving a screw that fastens the lens frame and temple.

2. The detachable eyeglass frame according to claim 1, wherein the outline of the screw receiving column is configured to a substantial trapezoid.

3. The detachable eyeglass frame according to claim 1, wherein the hinge is made of resilient stainless steel.

4. The detachable eyeglass frame according to claim 1, wherein the pocket is positioned lower than the edge of the temple insert blade.

* * * * *